(12) United States Patent
Hamilton, II et al.

(10) Patent No.: US 7,783,646 B2
(45) Date of Patent: Aug. 24, 2010

(54) SYSTEM, METHOD, AND COMPUTER READABLE MEDIA FOR IDENTIFYING AND RATING VIRTUAL UNIVERSE OBJECTS

(75) Inventors: Rick A. Hamilton, II, Charlottesville, VA (US); James R. Kozloski, New Fairfield, CT (US); Brian M. O'Connell, Cary, NC (US); Clifford A. Pickover, Yorktown Heights, NY (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 77 days.

(21) Appl. No.: 12/174,726

(22) Filed: Jul. 17, 2008

(65) Prior Publication Data

US 2010/0017428 A1 Jan. 21, 2010

(51) Int. Cl.
*G06F 17/30* (2006.01)
(52) U.S. Cl. .................. 707/751; 707/740; 705/10; 705/12; 705/14.1; 705/26
(58) Field of Classification Search ................. None
See application file for complete search history.

(56) References Cited

U.S. PATENT DOCUMENTS

| | | | | |
|---|---|---|---|---|
| 6,374,290 | B1 * | 4/2002 | Scharber et al. | 709/205 |
| 7,159,178 | B2 * | 1/2007 | Vogt et al. | 715/733 |
| 7,209,895 | B2 * | 4/2007 | Kundtz et al. | 705/26 |
| 7,298,378 | B1 * | 11/2007 | Hagenbuch et al. | 345/589 |
| 7,298,738 | B1 * | 11/2007 | Parruck et al. | 370/360 |

(Continued)

FOREIGN PATENT DOCUMENTS

JP 2005-005795 1/2005

(Continued)

OTHER PUBLICATIONS

Extended European Search Report dated Jun. 3, 2009.

(Continued)

*Primary Examiner*—Apu M Mofiz
*Assistant Examiner*—Hung D Le
(74) *Attorney, Agent, or Firm*—Cantor Colburn LLP

(57) ABSTRACT

A system, a method, and a computer readable media for identifying and rating a VU object in a virtual universe are provided. The method includes displaying first and second VU objects in a region of the virtual universe on a display device at a first time for a first user. The method further includes identifying the second VU object which modifies a view of the first VU object. The method further includes inputting first rating information associated with the second VU object that identifies a user perception of the second VU object. The method further includes inputting user view preference information indicating rating information for selecting VU objects to be displayed in the region of the virtual universe to the first user. The method further includes displaying the first VU object in the region of the virtual universe on the display device for the first user at a second time after the first time, while not displaying the second VU object based on both the first rating information associated with the second VU object, and the rating information of the user view preference information.

17 Claims, 9 Drawing Sheets

U.S. PATENT DOCUMENTS

| | | | |
|---|---|---|---|
| 7,305,073 B2 * | 12/2007 | Gioberti | 379/114.03 |
| 2001/0047290 A1 * | 11/2001 | Petras et al. | 705/10 |
| 2002/0042733 A1 * | 4/2002 | Lesandrini et al. | 705/10 |
| 2002/0128061 A1 | 9/2002 | Blanco | |
| 2003/0036944 A1 * | 2/2003 | Lesandrini et al. | 705/10 |
| 2003/0036948 A1 * | 2/2003 | Woodward et al. | 705/10 |
| 2005/0154693 A1 * | 7/2005 | Ebert | 707/1 |
| 2006/0238380 A1 * | 10/2006 | Kimchi et al. | 340/995.1 |
| 2006/0288041 A1 * | 12/2006 | Plastina et al. | 707/104.1 |
| 2007/0111794 A1 | 5/2007 | Hogan et al. | |
| 2007/0226628 A1 * | 9/2007 | Schlack | 715/733 |
| 2007/0268299 A1 | 11/2007 | Jung et al. | |
| 2008/0140683 A1 * | 6/2008 | Hanif et al. | 707/100 |
| 2008/0147659 A1 * | 6/2008 | Chen et al. | 707/7 |

FOREIGN PATENT DOCUMENTS

| | | | |
|---|---|---|---|
| WO | WO 2006020758 | * | 2/2006 |
| WO | WO 2006/116240 A2 | | 11/2006 |

OTHER PUBLICATIONS

Japan Office Action dated Sep. 16, 2009.

* cited by examiner

SYSTEM, METHOD, AND COMPUTER READABLE MEDIA FOR IDENTIFYING AND RATING VIRTUAL UNIVERSE OBJECTS

FIELD OF INVENTION

This application relates to a system, a method, and a computer readable media for identifying and rating virtual universe objects.

BACKGROUND OF INVENTION

A virtual universe is an interactive simulated environment accessed by multiple users through an on-line interface. Users inhabit and interact in the virtual universe via avatars, which are two or three-dimensional graphical representations of humanoids. There are many different types of virtual universe. However, there are several features many virtual universes generally have in common: (i) Shared Space: the world allows many users to participate at once; (ii) Graphical User Interface: the environment depicts space visually, ranging in style from 2-D "cartoon" imagery to more immersive 3-D environments; (iii) Immediacy: interaction takes place in real time, (iv) Interactivity: the environment allows users to alter, develop, build, or submit customized content: (v) Persistence: the environment's existence continues regardless of whether individual users are logged in; (vi) Socialization/Community: the environment allows and encourages the formation of social groups such as teams, guilds, clubs, housemates, and neighborhoods, for example.

An avatar can have a wide range of business and social experiences. Such business and social experiences are becoming more common in increasingly important in on-line virtual universes, such as that provided in the on-line world Second Life (Second life is a trademark of Linden Research in the United States, other countries, or both).

A viewable field is a field of view for a particular user. The viewable field for a particular user includes virtual universe objects ("VU objects") as well as avatars belonging to other users. The VU objects are elements in a virtual universe that do not represent a user. A VU object may be for example, buildings, statues, billboards, signs, and advertisements in the virtual universe. The viewable field of a particular user is determined by the virtual universe grid software according to geometries and textures that are currently loaded in the user's virtual universe client. The virtual universe grid determines a length of time that a user views an object based on processing data sent to each virtual universe client. VU objects are identified by Universally Unique Identifiers (UUIDs), which are unique identifiers associated with the VU objects to allow tables and even databases to be merged with the expectation that all identifiers will be unique. Each VU object has a unique UUID.

A problem may occur if a user creates or acquires a VU object that is deemed offensive to a broad community of users within the virtual universe. Typically, users must avoid a location of the offensive VU object until a host of the virtual universe views the offensive VU object and removes it. However, due to the complexity and relatively large scope of the virtual universe, it is extremely difficult for hosts to effectively monitor VU objects to determine which ones are offensive to the broad community of users.

Accordingly, the inventors herein have recognized a need for a system, a method, and a computer readable media for allowing users to identify and rate a VU object in a virtual universe.

SUMMARY OF INVENTION

A method for identifying and rating a VU object in a virtual universe in accordance with an exemplary embodiment is provided. The method includes displaying first and second VU objects in a region of the virtual universe on a display device at a first time for a first user. The method further includes identifying the second VU object which modifies a view of the first VU object. The method further includes inputting first rating information associated with the second VU object that identifies a user perception of the second VU object. The method further includes inputting user view preference information indicating rating information for selecting VU objects to be displayed in the region of the virtual universe to the first user. The method further includes storing the user view preference information in a first storage location. The user view preference information is associated with the region of the virtual universe and the first user. The method further includes displaying the first VU object in the region of the virtual universe on the display device for the first user at a second time after the first time, while not displaying the second VU object based on both the first rating information associated with the second VU object, and the rating information of the user view preference information.

A system for identifying and rating a VU object in a virtual universe in accordance with another exemplary embodiment is provided. The system includes a first display device and a first computer operably communicating with the first display device. The first computer is configured to induce the first display device to display first and second VU objects in a region of the virtual universe at a first time for a first user. The first computer is further configured to allow the first user to identify the second VU object which modifies a view of the first VU object. The first computer is further configured to allow the first user to input first rating information associated with the second VU object that identifies a user perception of the second VU object. The first computer is further configured to allow the first user to input user view preference information indicating rating information for selecting VU objects to be displayed in the region of the virtual universe to the first user. The first computer is further configured to store the user view preference information in a first storage location. The user view preference information is associated with the region of the virtual universe and the first user. The first computer is further configured to induce the first display device to display the first VU object in the region of the virtual universe for the first user at a second time after the first time, while not displaying the second VU object based on both the first rating information associated with the second VU object, and the rating information of the user view preference information.

A computer readable medium having computer-executable instructions for performing a method for identifying and rating a VU object in a virtual universe in accordance with another exemplary embodiment is provided. The method includes displaying first and second VU objects in a region of the virtual universe on a display device at a first time for a first user. The method further includes identifying the second VU object which modifies a view of the first VU object. The method further includes inputting first rating information associated with the second VU object that identifies a user perception of the second VU object. The method further includes inputting user view preference information indicating rating information for selecting VU objects to be displayed in the region of the virtual universe to the first user. The method further includes storing the user view preference information in a first storage location. The user view preference information is associated with the region of the virtual universe and the first user. The method further includes displaying the first VU object in the region of the virtual universe on the display device for the first user at a second time after the first time, while not displaying the second VU object based on both the first rating information associated with the second VU object, and the rating information of the user view preference information.

DESCRIPTION OF EXEMPLARY EMBODIMENTS

Figure 1:
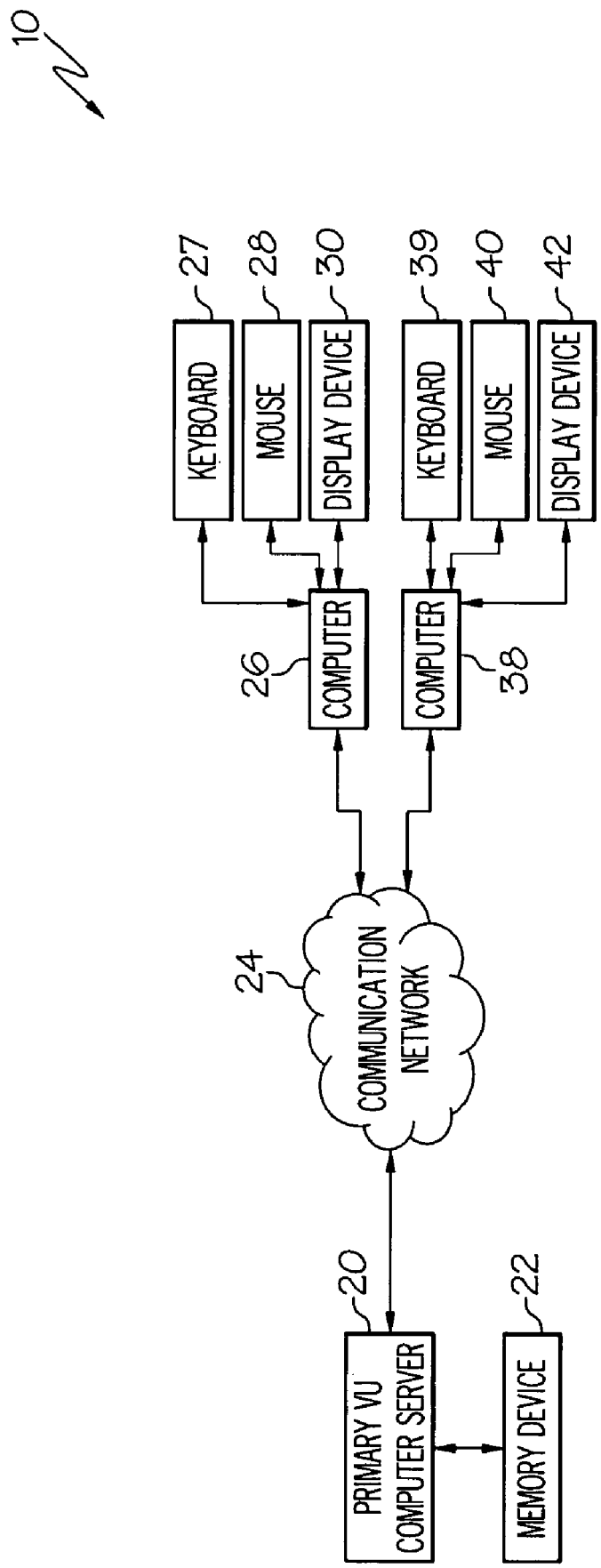
FIG. 1 is a schematic of a system for identifying and rating a VU object in a virtual universe in accordance with an exemplary embodiment.

Referring to FIG. 1, a system 10 for identifying and rating a VU object in a virtual universe in accordance with an exemplary embodiment are provided. The system 10 includes a primary VU computer server 20, a memory device 22, a communication network 26, a computer 26, a keyboard 27, a mouse 28, a display device 30, a computer 38, a keyboard 39, a mouse 40, and a display device 42. An advantage of the system 10 is that the system 10 allows users to identify and rate a VU object indicating a degree of user offensiveness to the VU object. Further, the system 10 allows user to associate category information with a VU object. Further, the system 10 allows a user to specify view preference information so that the system 10 does not display VU objects for the user that do not meet the view preference information associated with the user. It should be noted that the term "storage location" comprises at least one of a file, a database, a table, a data structure, or a portion thereof Further, although some exemplary embodiments store data in a file, the data could be stored at any storage location.

The primary VU computer server 20 is configured to execute software routines for providing data corresponding to avatars and other VU objects associated with one or more users in response to requests received from the computers 26 and 38.

The communication network 24 is configured to route data between the primary VU computer server 20 and the computers 26 and 38.

The computer 26 is configured to receive data corresponding to VU Object UUIDs and associated VU objects from the primary VU computer server 20 for a first user. Further, the computer 26 is configured to display VU objects in the virtual universe on the display device 30. The computer 26 executes algorithms stored in a local hard-drive and a RAM for displaying the virtual universe and associated VU objects and avatars on the display device 30. The computer 26 also receives commands from the keyboard 27 and the mouse 28 for moving an avatar 68 of FIG. 2 associated with the first user to desired locations within the virtual universe and for allowing the avatar 68 to complete desired tasks at desired locations within the virtual universe. The computer 26 also receives data from the input devices 27, 28 for identifying and rating one or more VU objects in the virtual universe as will be described in greater detail below.

The computer 38 is configured to receive data corresponding to VU Object UUIDs and associated VU objects from the primary VU computer server 20 for a second user. Further, the computer 38 is configured to display VU objects in the virtual universe on the display device 42. The computer 38 executes algorithms stored in a local hard-drive and a RAM for displaying the virtual universe and associated VU objects and avatars on the display device 42. The computer 38 also receives commands from the keyboard 39 and the mouse 40 for moving an avatar associated with the second user to desired locations within the virtual universe and for allowing the avatar to complete desired tasks at desired locations within the virtual universe. The computer 38 also receives data from the input devices 39, 40 for identifying and rating one or more VU objects in the virtual universe as will be described in greater detail below.

Figure 2:
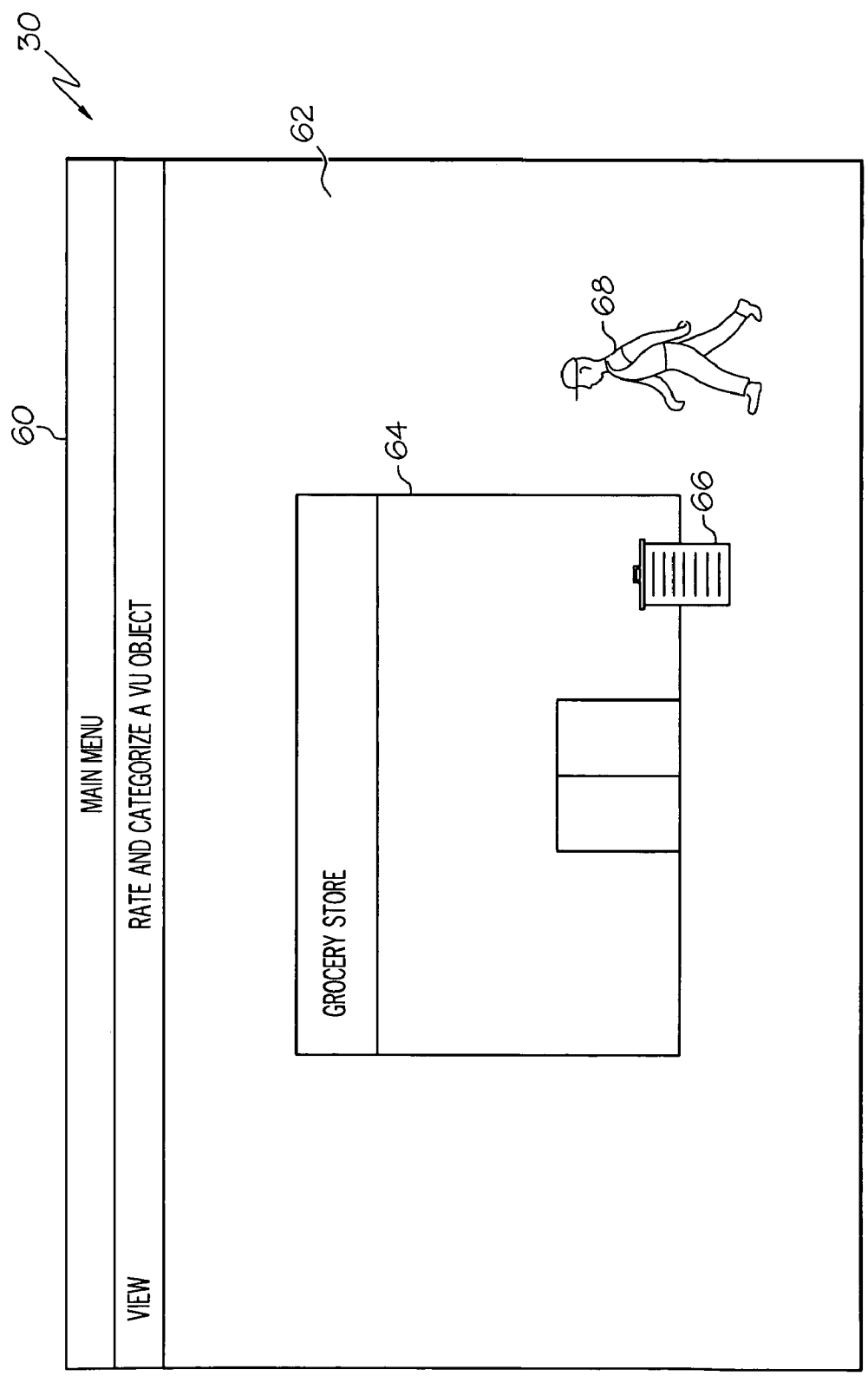
FIG. 2 is a schematic of a Main Menu utilized in the system of FIG. 1.

Referring to FIG. 2, the computer 26 of FIG. 1 induces the display device 30 to display a Main Menu 60. In one exemplary embodiment, the Main Menu 60 has a "View" menu item and a "Rate and Categorize a VU Object" menu item. Further, the display device 30 displays a region 62 of a virtual universe. The region 62 has a virtual grocery store 64, a virtual garbage can 66 disposed in front of the virtual grocery store, and an avatar 68 associated with the first user. The owner of the virtual grocery store 64 could utilize the system 10 of FIG. 1 to rate the virtual garbage can 66 as an objectionable VU object in front of the grocery store 64, for example.

Figure 5:
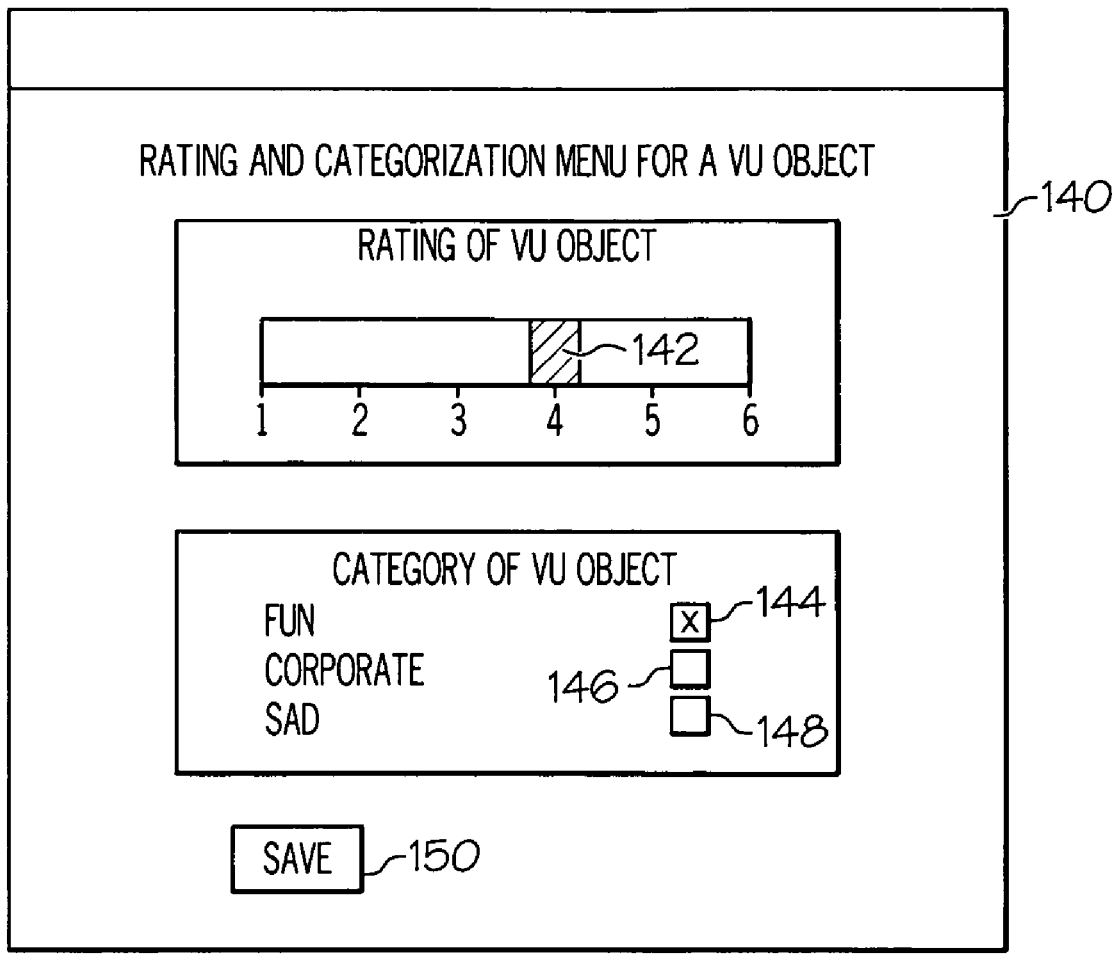
FIG. 5 is a schematic of a Rating and Categorization Menu utilized in the system of FIG. 1.

Referring to FIGS. 2 and 5, when a first user selects the "Rate and Categorize a VU Object" menu item on the Main Menu 60 and then selects a VU object in the region 62 utilizing the mouse 28, the display device 30 displays the Rating and Categorization Menu 140.

The Rating and Categorization Menu 140 is configured to allow the first user to select rating information associated with the selected VU object indicating, in some exemplary embodiments, a degree of user offensiveness to the VU object utilizing the rating slider bar 142. The first user can select one of the rating numbers (1-6) using the rating slider bar 142 indicating: 1-Ideal, 2-Appealing, 3-Useful, 4-Not Useful, 5-Offensive, and 6-Unacceptable, utilizing the mouse 28. In particular, the first user can move the rating slider bar 142 to one of six positions indicating the degree of user offensiveness to the selected VU object. For example, the first user can select a rating number of "4" for the garbage can 66 illustrated on FIG. 2. In some exemplary embodiments, the user may input other information such as why they chose a rating. Further, the user may elect to send feedback to an object owner, utilizing a menu option that will send the information to the object owner. In this way an object owner may be induced to change or remove an object generated by the object owner. In cases where an object owner changes an object, users who previously selected a rating for the object may be notified of the change to the object and of the need to consider rating the changed object.

The Rating and Categorization Menu 140 is further configured to allow the first user to select category information associated with the selected VU object that identifies the user perception of the VU object. In particular, the first user can select one of the category check boxes 144, 146, 148 utilizing the mouse 28. If the check box 144 is selected, the selected VU object is associated with a "fun" category. For example, the first user can select the "fun" category for the garbage can 66 illustrated on FIG. 2. If the check box 146 is selected, the selected VU object is associated with a "corporate" category. If the check box 148 is selected, the selected VU object is associated with a "sad" category. In an alternative embodiment, the Rating and Categorization Menu 140 has a plurality of other categories for identifying user perception of a VU object. Categories may be predefined, such as established by an administrator, or ad hoc, such as entered by a user with a text box control.

Figure 6:
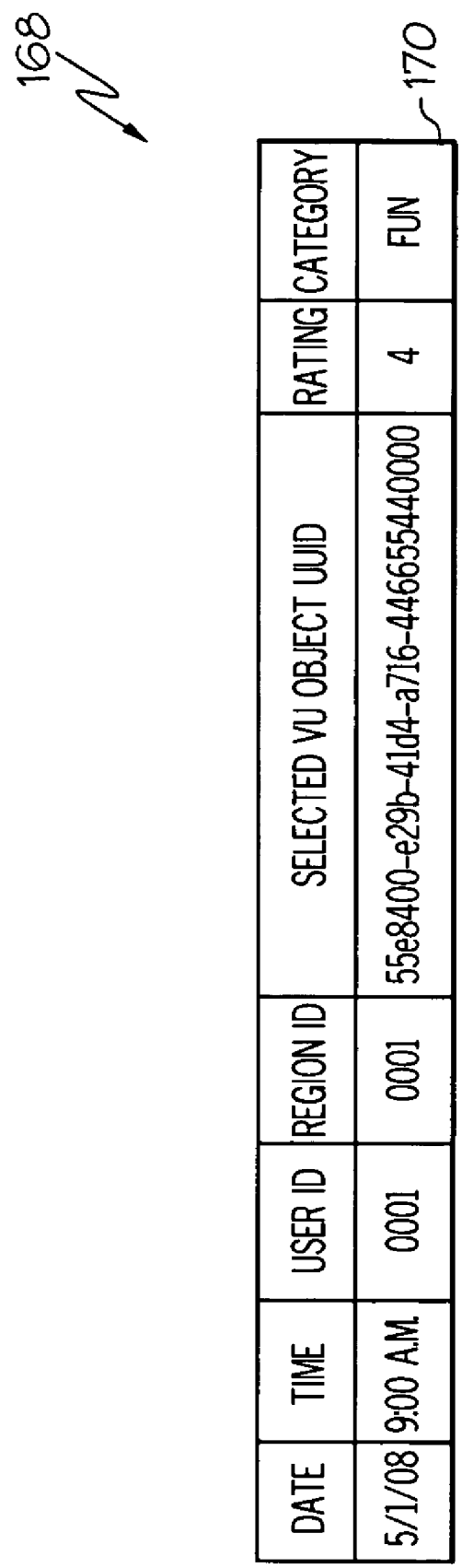
FIG. 6 is a schematic of a database record utilized by the system of FIG. 1.

Referring to FIGS. 5 and 6, the Rating and Categorization Menu 140 is further configured to allow the first user to select a save command button 150 to save the rating information and category information associated with a selected VU object in a record of a database. For example, when a first user selects the save command button 150 utilizing the mouse 28, the computer 26 can generate a record 168 in the memory device 22 having the following fields: (i) date, (ii) time, (iii) user ID, (iv) region ID, (v) selected VU object UUID, (vi) rating, and (vii) category. The date field has date information indicating when the record 168 was generated. The time field has time information indicating a time when the record 168 was generated. The user ID field has a user ID associated with the first user accessing the virtual universe. For example, the user ID field can have a user ID "0001" associated with the first user. The region ID field has a region ID identifying a portion of the virtual universe that an avatar associated with the first user is within. For example, the region ID field can have a region ID "0001" associated with the region 62 the virtual grocery store 64 and the virtual garbage can 66 is located within. The selected VU object UUID field has a UUID associated with the selected VU object. For example, the selected VU object UUID field can have a UUID "550e8400-e29b-41d4-a716-446655440000" associated with the virtual garbage can 66. The rating field has a numerical value selected by the rating slider bar 142. For example, the rating field can have a value "4" associated with the virtual garbage can 66. The category field has a category identifier selected by at least one of the category checkboxes 144, 146, 148. For example, the category field can have an identifier "fun" associated with the virtual garbage can 66. It should be noted that after the computer 26 generates the record 168, the computer 26 sends a message having the record 168 to the primary VU computer server 20 instructing the computer server 20 to store the record 168 in the memory device 22.

Figure 3:
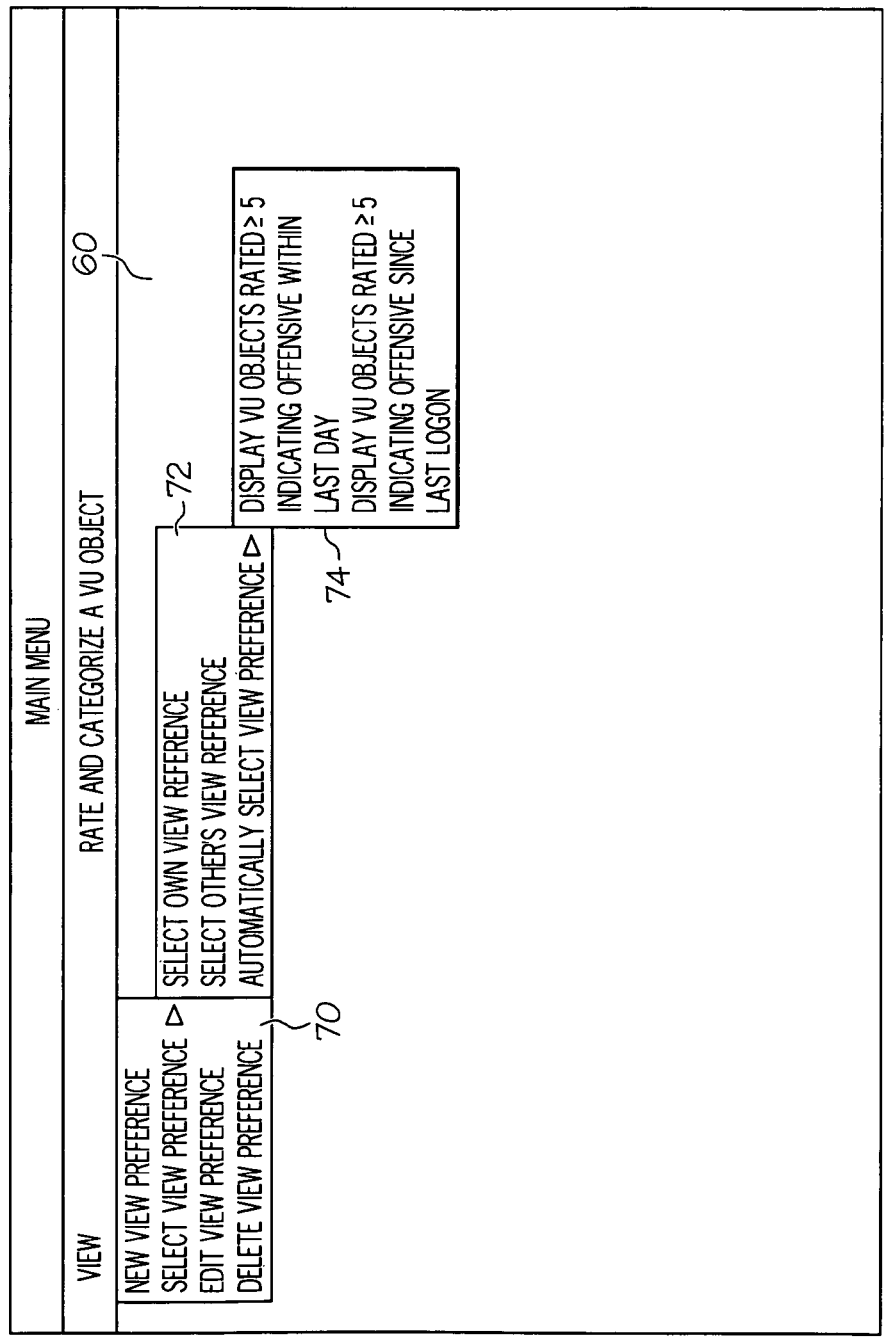
FIG. 3 is another schematic of the Main Menu of FIG. 2.
Figure 4:
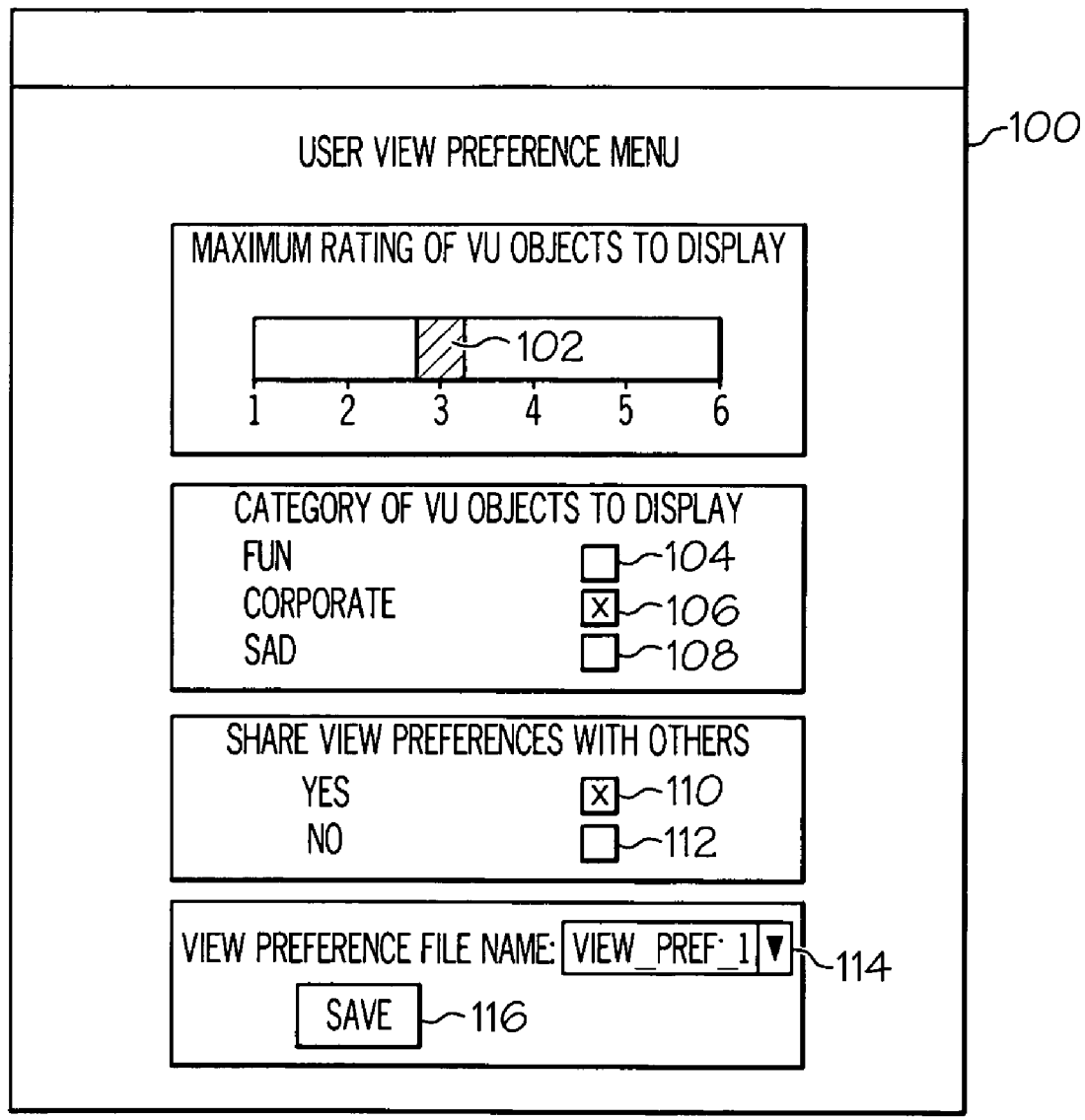
FIG. 4 is a schematic of a User View Preference Menu utilized in the system of FIG. 1.

Referring to FIGS. 3 and 4, when a first user selects to the "View" menu item on the Main Menu 60 utilizing the mouse 28, a pull-down menu 70 is displayed. The pull-down menu 70 includes: (i) a "New View Preference" menu item, (ii) a "Select View Preference" menu item, (iii) an "Edit View Preference" menu item, and (iv) a "Delete View Preference" menu item.

When a first user selects the "New View Preference" menu item utilizing the mouse 28, the first user will be allowed to input user view preference information indicating rating information and category information for selecting VU objects to be displayed in the region 62 of the virtual universe for the first user. In particular, when the first user selects the "New View Preference" menu item, the User View Preference Menu 100 is displayed.

The User View Preference Menu 100 is configured to allow the first user to select rating information for selecting VU objects to be displayed in the region 62 of the virtual universe to the first user, utilizing the rating slider bar 102. In particular, the first user can select one of the maximum rating numbers (1-6) using the rating slider bar 102 indicating: 1-Ideal, 2-Appealing, 3-Useful, 4-Not Useful, 5-Offensive, and 6-Unacceptable, utilizing the mouse 28. In particular, the first user can move the rating slider bar 102 to one of six positions indicating a maximum degree of user offensiveness that the viewer would desire to view in the region 62. For example, the first user can select a maximum rating number of "3" as shown. Thus, for example, if the garbage can 66 (in FIG. 1) has a rating number of "4" which is greater than the maximum rating number of "3", the virtual garbage can 66 would not be displayed in front of the virtual grocery store 64 to the first user. In an alternative embodiment, the rating slider bar may be used to indicate other meanings. For example, in a VU utilized by a single company for corporate purposes, ratings of offensiveness may not be useful, and therefore may be substituted for any meaning, such as ratings of conformity to the corporate vision and purpose.

The User View Preference Menu 100 is further configured to allow the first user to select category information associated VU objects that the first user desires to view in the region 62. In particular, the first user can select one of the category check boxes 104, 106, 108 utilizing the mouse 28. If the check box 104 is selected, the VU objects in a "fun" category are always to be displayed in the region 62 and the VU objects in the "sad" category and the "corporate" category are not to be displayed. If the check box 106 is selected, the VU objects having a "corporate" category are always to be displayed in the region 62 and the VU objects in the "fun" category and "sad" category are not to be displayed. If the check box 108 is selected, the VU objects having a "sad" category are always to be displayed in the region 62 and the VU objects in the "fun" category and "corporate" category are not to be displayed. It should be noted that in an alternative embodiment, the User View Preference Menu 100 has a plurality of other categories. Similar to the object ratings, in an alternative embodiment, the User View Preference Menu 100 can have a rating mechanism for the categories, such as to select a degree of "corporate" or "fun" for example.

The User View Preference Menu 100 is further configured to allow the first user to share the user's view preferences for the region 62 with other users. In particular, the first user can select one of the share view preference check boxes 110, 112 utilizing the mouse 28. If the share view preference check box 110 is selected, the user view preference information in the User View Preference Menu 100 can be viewed and used by other users. If the share view preference check box 112 is selected, the user view preference information in the User View Preference Menu 100 cannot be viewed and used by other users. In an alternative embodiment, the user may be able to select specific users who may or may not be able to select the shared view preference, such as through searching and selecting users or groups, or through opting to allow all user-defined "buddies" access.

The User View Preference Menu 100 is further configured to allow the first user to store the user view preference information selected therein. In particular, the first user can specify a file name in the file name text box 114, utilizing the keyboard 27. Thereafter, the first user can select the save command button 116 to save a file having the file name in the memory 22, utilizing the mouse 28. In particular, when the save command 116 is selected, the computer 26 sends the file to the primary VU computer server 20 with instructions to store the file in the memory device 22. The computer server 20 stores the file in the memory device 22 in response to receiving the file. In an alternative embodiment, where the user view preference data is stored only in the memory device 22 and interacted with only via VU computer server 20, the file saving option may be disabled.

Referring to FIG. 3, when a first user selects the "Select View Preference" menu item utilizing the mouse 28, a pull-down menu 72 is displayed. The pull-down menu 72 includes: (i) a "Select Own View Preference" menu item, (ii) a "Select Other's View Preference" menu item, and (iii) an "Automatically Select View Preference" menu item.

When the first user selects the "Select Own View Preference" menu item, utilizing the mouse 28, the computer 26 accesses the file having the user view preference information associated with the first user in the memory 22, via the communication network 24 and the primary VU computer server 20. Further, the computer 26 displays only VU objects in the region 62 of the virtual universe complying with the user view preference information.

When the first user selects the "Select Other's View Preference" menu item utilizing the mouse 28, the computer 26 accesses files having the user view preference information associated with other users in the memory 22, via the communication network 24 and the primary VU computer server 20. Thereafter, the first user can select one of the user view preference information files displayed on the display device 30 that is associated with another user, utilizing the mouse 28.

When the first user selects the "Automatically Select View Preference" menu item utilizing the mouse 28, the pull-down menu 74 is displayed. The pull-down menu 74 includes: (i) a "Display VU Objects Marked >=5 Indicating Offensiveness Within Last Day" menu item, and (ii) a "Display VU Objects Marked >=5 Indicating Offensiveness Since Last Logon" menu item. In alternative embodiments, there may be more, fewer, or different items to select. Further, the user may be able to choose the criteria that will be selectable, such as different operands, ratings, time spans, categories, users or groups, and the like.

When the first user selects the "Display VU Objects Rated >=5 Indicating Offensiveness Within Last Day" menu item utilizing the mouse 28, the computer 26 displays only VU objects in the region 62 of the virtual universe that have been given a rating of >=5 within the last day.

When the first user selects the "Display VU Objects Rated >=5 Indicating Offensiveness Since Last Logon" menu item utilizing the mouse 28, the computer 26 displays only VU objects in the region 62 of the virtual universe that have been given a rating of >=5 since the last logon of the first user.

Referring again to the pull-down menu 70, when the first user selects the "Edit View Preference" menu item utilizing the mouse 28, the User View Preference Menu 100 is displayed having the user view preference information associated with the first user. Thereafter, the user can edit the user view preference information on the User View Preference Menu 100.

When the first user selects the "Delete View Preference" menu item in the pull-down menu 70, the computer 26 instructs the primary VU computer server 20 to delete the file in the memory device 22 having the user view preference information associated with the first user.

Figure 7:
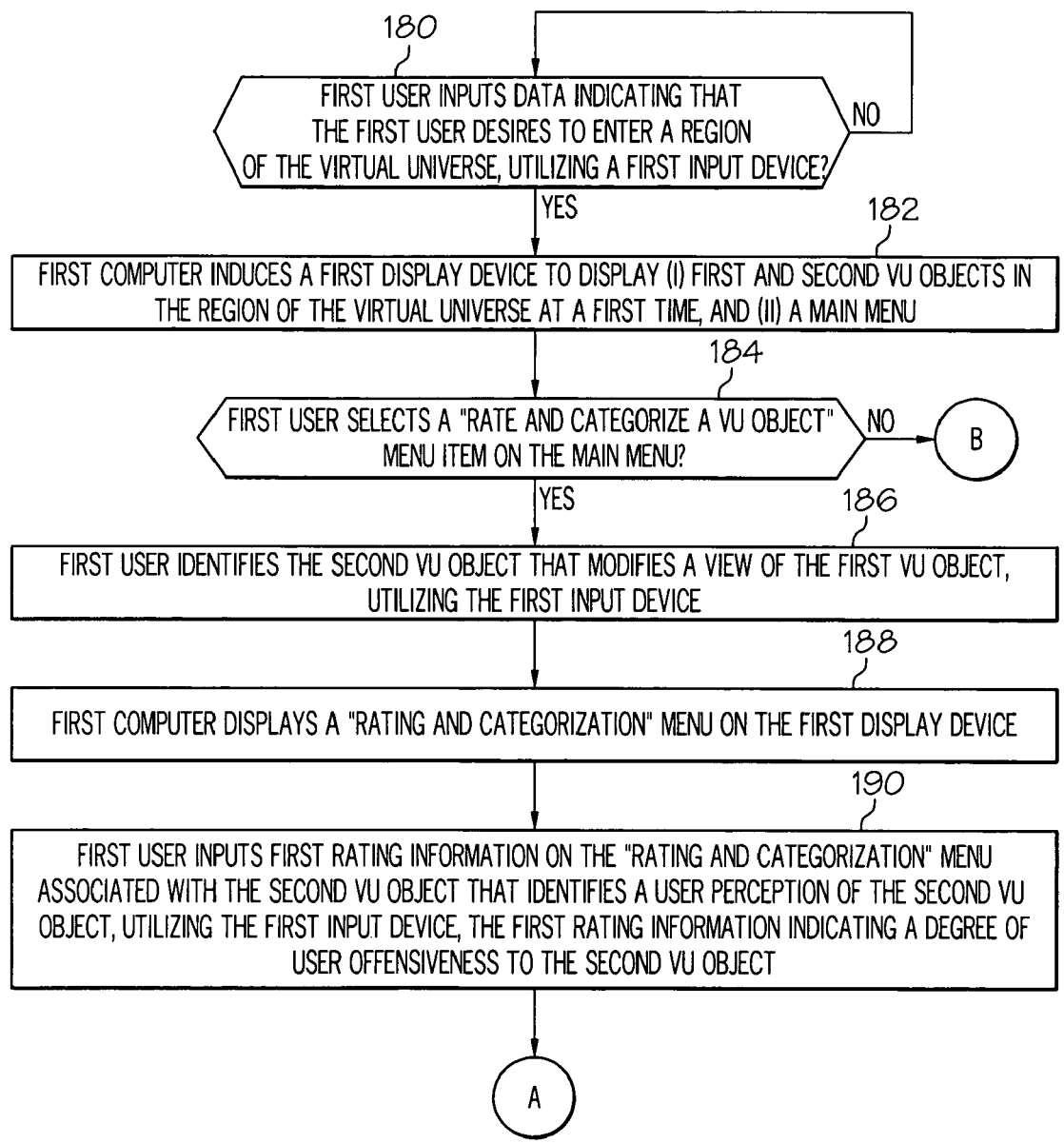
FIGS. 7-9 are flowcharts of a method for identifying and rating a VU object in a virtual universe in accordance with another exemplary embodiment.
Figure 8:
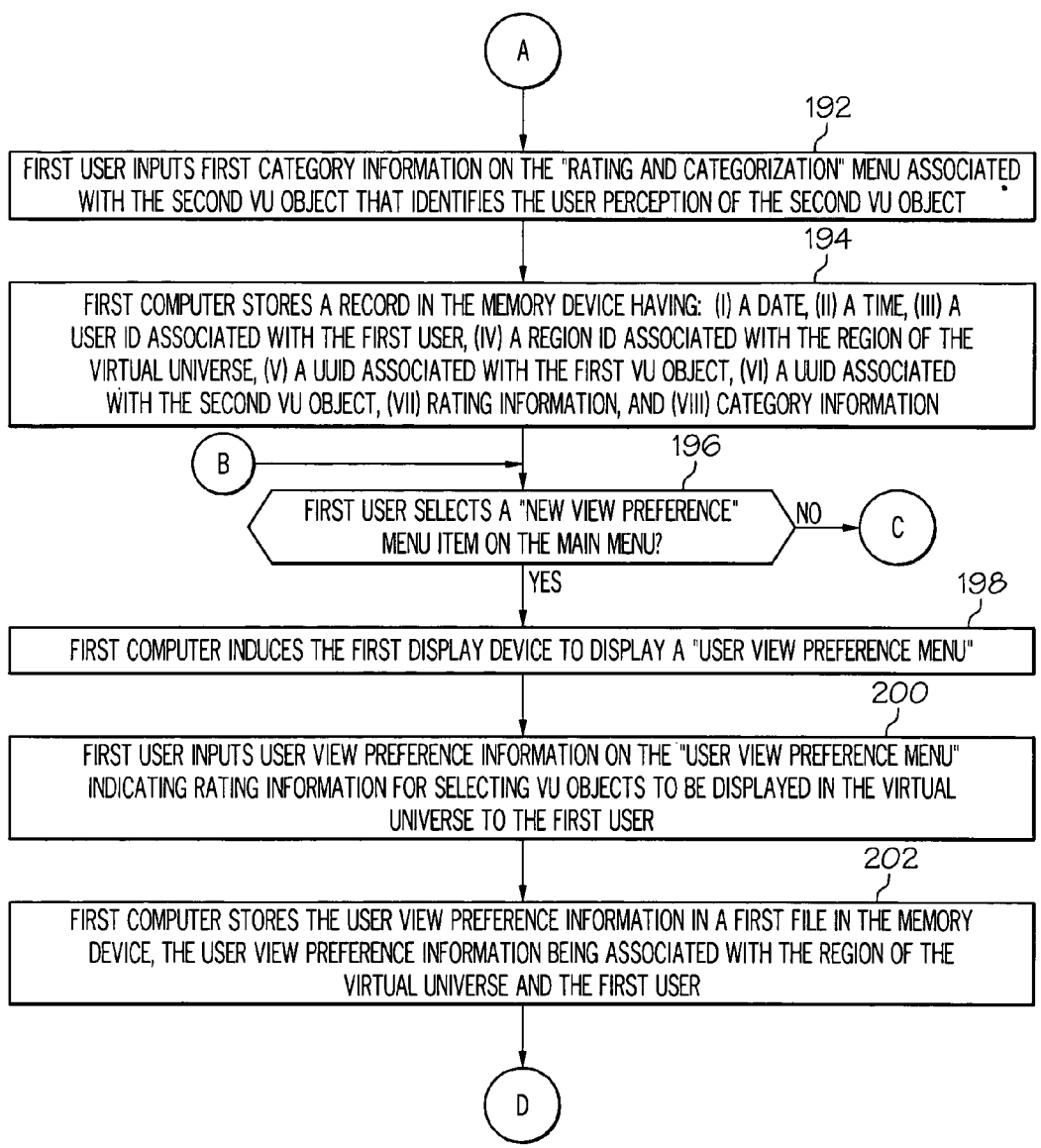
Figure 9:
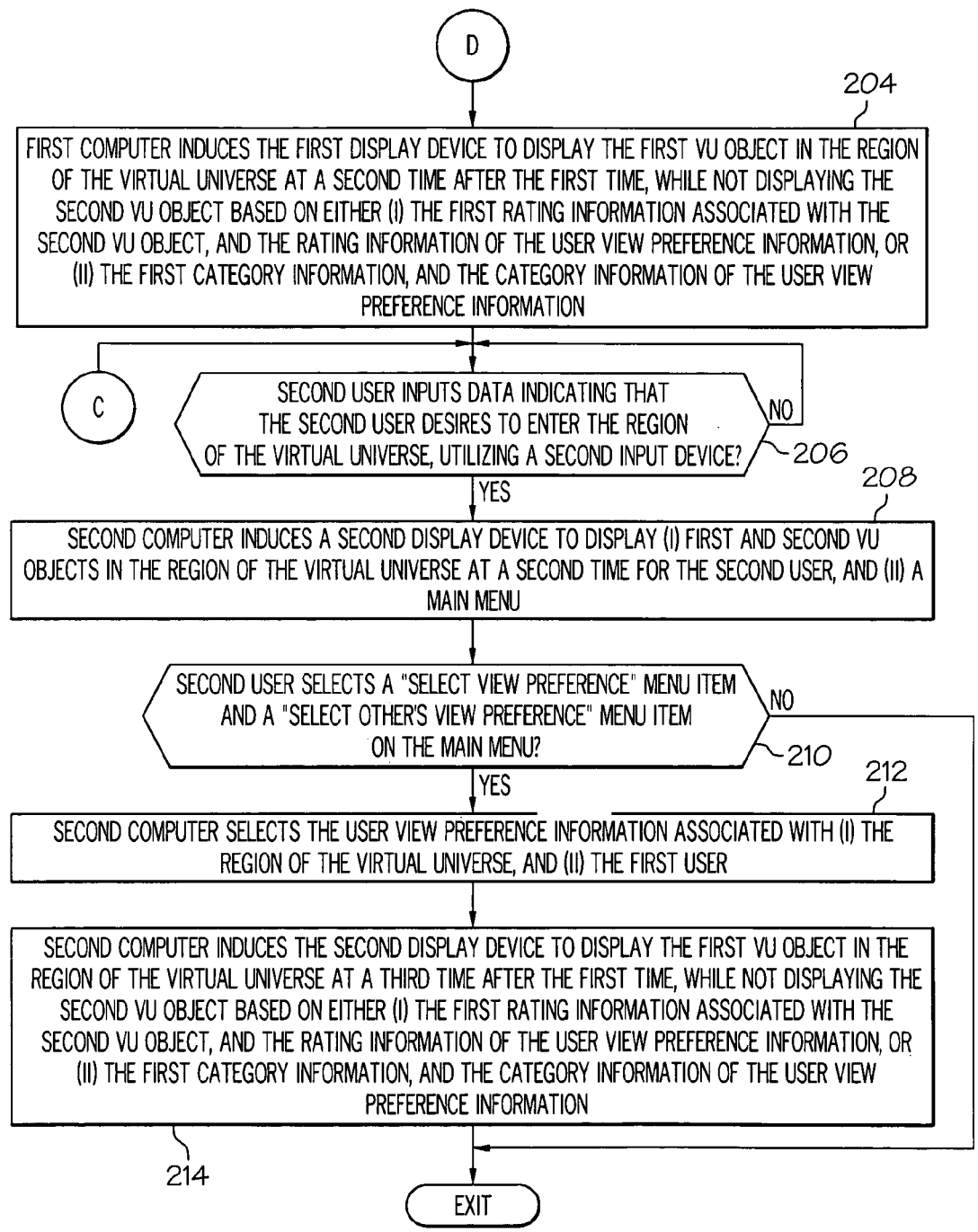

Referring to FIGS. 7-9, a flowchart of a method for identifying and rating a VU object in a virtual universe will now be explained. It should be noted that in an alternative embodiment, the steps described as being performed by the computer 26 may be performed by the VU computer server 20.

At step 180, the computer 26 makes a determination as to whether a first user has inputted data indicating that the first user desires to enter a region 62 of the virtual universe, utilizing a first input device. If the value of step 180 equals "yes", the method advances to step 182. Otherwise, the method returns to step 180.

At step 182, the computer 26 induces the display device 30 to display (i) first and second VU objects in the region of the virtual universe at a first time, and (ii) the Main Menu 60.

At step 184, the computer 26 makes a determination as to whether the user has selected a "Rate and Categorize a VU Object" menu item on the Main Menu 60. If the value of step 184 equals "yes", the method advances to step 186. Otherwise, the method advances to step 196.

At step 186, the first user identifies the second VU object that modifies a view of the first VU object, utilizing the first input device.

At step 188, the computer 26 displays the Rating and Categorization Menu 140 on the display device 30.

At step 190, the first user inputs first rating information on the Rating and Categorization Menu 140 associated with the second VU object that identifies a user perception of the second VU object, utilizing the first input device. The first rating information indicates a degree of user offensiveness to the second VU object.

At step 192, the first user inputs first category information on the Rating and Categorization Menu 140 associated with the second VU object that identifies the user perception of the second VU object.

At step 194, computer 26 stores the record 168 in the memory device 22 having: (i) a date, (ii) a time, (iii) a User ID associated with the first user, (iv) a region ID associated with the region of the virtual universe, (v) a UUID associated with the second VU object, (vi) rating information, and (vii) category information.

At step 196, the computer 26 makes a determination as to whether the first user selects a "New View Preference" menu item on the Main Menu 60. If the value of step 196 equals "yes", the method advances to step 198. Otherwise, the method advances to step 206.

At step 198, the computer 26 induces the display device 30 to display the User View Preference Menu 100.

At step 200, the first user inputs user view preference information on the User View Preference Menu 100 indicating rating information for selecting VU objects to be displayed in the virtual universe to the first user.

At step 202, the computer 26 stores the user view preference information in a first file in the memory device 22. The user view preference information is associated with the region 62 of the virtual universe and the first user.

At step 204, the computer 26 induces the display device 30 to display the first VU object in the region 62 of the virtual universe at a second time after the first time, while not displaying the second VU object based on either (i) the first rating information associated with the second VU object, and the rating information of the user view preference information, or (ii) the first category information, and the category information of the user view preference information.

At step 206, a computer 38 makes a determination as to whether a second user has inputted data indicating that the second user desires to enter the region 62 of the virtual universe, utilizing a second input device.

At step 208, the computer 38 induces the display device 42 to display: (i) first and second VU objects in the region of the virtual universe at a second time for the second user, and (ii) a Main Menu 60.

At step 210, the computer 38 makes a determination as to whether the second user has selected a "Select View Preference" menu item and a "Select Other's View Preference" menu item on the Main Menu 60. If the value of step 210 equals "yes", the method advances to step 212. Otherwise, the method is exited.

At step 212, the computer 38 selects the user view preference information associated with (i) the region 62 of the virtual universe, and (ii) the first user. In particular, the computer 38 can access the file in the memory device 22 having the user view preference information associated with the first user, utilizing the communication network 24 and the primary VU computer server 20.

At step 214, the computer 38 induces the display device 42 to display the first VU object in the region of the virtual universe at a third time after the first time, while not displaying the second VU object based on either (i) the first rating information associated with the second VU object, and the rating information of the user view preference information, or (ii) the first category information, and the category information of the user view preference information. After step 214, the method is exited.

The above-described methods can be at least partially embodied in the form of one or more computer readable media having computer-executable instructions for practicing the method. The computer-readable media can comprise one or more of the following: floppy diskettes, CD-ROMs, hard-drives, flash memory, and other computer-readable media known to those skilled in the art; wherein, when the computer-executable instructions are loaded into and executed by one or more computers or computer servers, the one or more computers or computer servers become an apparatus for practicing the invention.

The system, the method, and the computer readable media described herein represent a substantial advantage over other systems, methods, and computer readable media. In particular, the system, the method, and the computer readable media provide a technical effect of allowing a user to identify and rate a VU object in a virtual universe.

While the invention is described with reference to an exemplary embodiment, it will be understood by those skilled in the art that various changes may be made and equivalence may be substituted for elements thereof without departing from the scope of the invention. In addition, many modifications may be made to the teachings of the invention to adapt to a particular situation without departing from the scope thereof Therefore, it is intended that the invention not be limited the embodiments disclosed for carrying out this invention, but that the invention includes all embodiments falling with the scope of the appended claims. Moreover, the use of the terms first, second, etc. does not denote any order of importance, but rather the terms first, second, etc. are used to distinguish one element from another.

What is claimed is:

1. A method for identifying and rating a Virtual Universe (VU) object in a virtual universe, comprising:
    displaying first and second VU objects in a region of the virtual universe on a display device at a first time for a first user;
    identifying the second VU object which modifies a view of the first VU object;
    inputting first rating information associated with the second VU object that identifies a user perception of the second VU object;
    inputting user view preference information indicating rating information for selecting VU objects to be displayed in the region of the virtual universe to the first user;
    storing the user view preference information in a first storage location, the user view preference information being associated with the region of the virtual universe and the first user;
    processing information concerning the viewing and selecting by multiple users of one another's preference information;
    displaying rating levels for the first VU object for selected time periods including the last time the first user accessed the virtual universe; and
    displaying the first VU object in the region of the virtual universe on the display device for the first user at a second time after the first time, while not displaying the second VU object based on both the first rating information associated with the second VU object, and the rating information of the user view preference information.

2. The method of claim 1, wherein the first rating information indicates a degree of user offensiveness to the second VU object.

3. The method of claim 1, wherein the rating information in the user view preference information comprises at least one of a rating number and a rating word indicating a degree of user offensiveness that is acceptable to the first user for displaying VU objects.

4. The method of claim 1, further comprising:
    selecting the user view preference information associated with the region of the virtual universe by a second user; and
    displaying the first VU object in the region of the virtual universe on another display device for the second user at a third time after the first time, while not displaying the second VU object based on both the first rating information associated with the second VU object and the user view preference information.

5. The method of claim 1, further comprising:
    inputting first category information associated with the second VU object that identifies the user perception of the second VU object;
    inputting user view preference information indicating category information for selecting VU objects to be displayed in the region of the virtual universe to the first user; and
    displaying the first VU object in the region of the virtual universe on the display device at a third time after the first time, while not displaying the second VU object based on the first category information associated with the second VU object, and the category information of the user view preference information.

6. The method of claim 5, wherein the first category information indicates a category name describing VU objects.

7. The method of claim 5, wherein the category information in the user view preference information comprises a category name associated with VU objects which is acceptable to the first user for displaying the VU objects.

8. The method of claim 5, further comprising:
    selecting user view preference information associated with the region of the virtual universe by a second user; and
    displaying the first VU object in the region of the virtual universe on a second display device for the second user at a fourth time after the first time, while not displaying the second VU object based on both the first category information associated with the second VU object, and the category information of the user view preference information.

9. A system for identifying and rating a Virtual Universe (VU) object in a virtual universe, comprising:
    a first display device; and
    a first computer operably communicating with the first display device, the first computer configured to induce the first display device to display first and second VU objects in a region of the virtual universe at a first time for a first user;

the first computer further configured to allow the first user to identify the second VU object which modifies a view of the first VU object;

the first computer further configured to allow the first user to input first rating information associated with the second VU object that identifies a user perception of the second VU object;

the first computer further configured to allow the first user to input user view preference information indicating rating information for selecting VU objects to be displayed in the region of the virtual universe to the first user;

the first computer further configured to store the user view preference information in a first storage location, the user view preference information being associated with the region of the virtual universe and the first user;

the first computer further configured to notify previous users of one of the selected VU objects of a change to the selected VU object, and to notify the previous users of a need to give the selected VU object a second rating;

the first computer configured to receive information inputted from the first user regarding reasons the first user inputted the rating information for one of the selected VU objects; and the first computer further configured to induce the first display device to display the first VU object in the region of the virtual universe for the first user at a second time after the first time, while not displaying the second VU object based on both the first rating information associated with the second VU object, and the rating information of the user view preference information.

10. The system of claim 9, wherein the first rating information indicates a degree of user offensiveness to the second VU object.

11. The system of claim 9, wherein the rating information in the user view preference information comprises at least one of a rating number and a rating word indicating a degree of user offensiveness that is acceptable to the first user for displaying VU objects.

12. The system of claim 9, further comprising:
a second computer configured to access the first storage location to allow a second user to select the user view preference information associated with the region of the virtual universe; and
the second computer further configured to induce a second display device to display the first VU object in the region of the virtual universe for the second user at a third time after the first time, while not displaying the second VU object based on both the first rating information associated with the second VU object and the user view preference information.

13. The system of claim 9, wherein:
the first computer further configured to allow the first user to input first category information associated with the second VU object that identifies the user perception of the second VU object;
the first computer further configured to allow the first user to input user view preference information indicating category information for selecting VU objects to be displayed in the region of the virtual universe to the first user; and
the first computer further configured to induce the first display device to display the first VU object in the region of the virtual universe at a third time after the first time, while not displaying the second VU object based on the first category information associated with the second VU object, and the category information of the user view preference information.

14. The system of claim 13, wherein the first category information indicates a category name describing VU objects.

15. The system of claim 13, wherein the category information in the user view preference information comprises a category name associated with VU objects which is acceptable to the first user for displaying the VU objects.

16. The system of claim 13, further comprising:
a second computer configured to access the first storage location to allow a second user to select the user view preference information associated with the region of the virtual universe; and
the second computer further configured to induce a second display device to display the first VU object in the region of the virtual universe for the second user at a fourth time after the first time, while not displaying the second VU object based on both the first category information associated with the second VU object, and the category information of the user view preference information.

17. A computer readable media having computer-executable instructions for performing a method for identifying and rating a Virtual Universe (VU) object in a virtual universe, the method comprising:
displaying first and second VU objects in a region of the virtual universe on a display device at a first time for a first user;
identifying the second VU object which modifies a view of the first VU object;
inputting first rating information associated with the second VU object that identifies a user perception of the second VU object;
inputting user view preference information indicating rating information for selecting VU objects to be displayed in the region of the virtual universe to the first user;
storing the user view preference information in a first storage location, the user view preference information being associated with the region of the virtual universe and the first user;
searching predefined user records using selected parameters;
selecting a plurality of the predefined users and sharing the first user view preference information with the selected predefined users; and
the first computer further configured to notify previous users of one of the selected VU objects of a change to the selected VU object, and to notify the previous users of a need to give the selected VU object a second rating;
the first computer configured to receive information inputted from the first user regarding reasons the first user inputted the rating information for one of the selected VU objects; and
displaying the first VU object in the region of the virtual universe on the display device for the first user at a second time after the first time, while not displaying the second VU object based on both the first rating information associated with the second VU object, and the rating information of the user view preference information.

* * * * *